June 16, 1925.                G. CONSTANTINESCO                1,542,668
                      METHOD AND MEANS FOR TRANSMITTING POWER
                         Filed June 26, 1922      10 Sheets-Sheet 1
Fig.1.                         Fig.2.
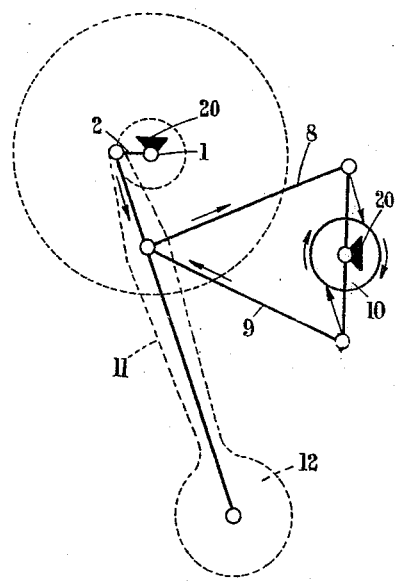
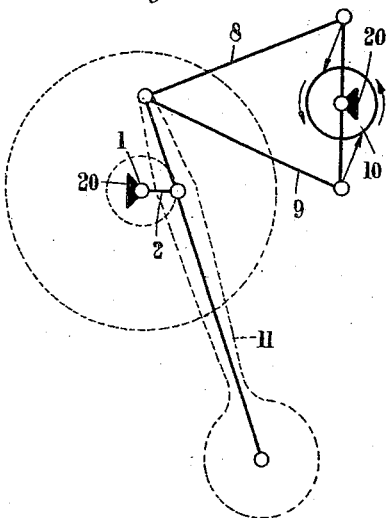
Fig. 3.
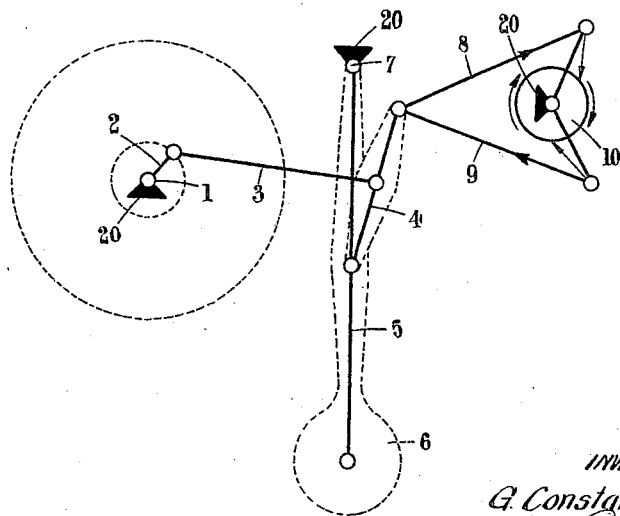
INVENTOR
G. Constantinesco
Att'y June 16, 1925.                                                         1,542,668
G. CONSTANTINESCO
METHOD AND MEANS FOR TRANSMITTING POWER
Filed June 26, 1922    10 Sheets-Sheet 2

INVENTOR
G. Constantinesco
by
Att'y

June 16, 1925.   1,542,668
G. CONSTANTINESCO
METHOD AND MEANS FOR TRANSMITTING POWER
Filed June 26, 1922   10 Sheets-Sheet 3

INVENTOR
G. Constantinesco

June 16, 1925.

G. CONSTANTINESCO

METHOD AND MEANS FOR TRANSMITTING POWER

Filed June 26, 1922   10 Sheets-Sheet 4

INVENTOR
G. Constantinesco
by
Att'y

June 16, 1925.

G. CONSTANTINESCO

METHOD AND MEANS FOR TRANSMITTING POWER

Filed June 26, 1922    10 Sheets-Sheet 5

INVENTOR
G. Constantinesco by
Att'y.

June 16, 1925.

G. CONSTANTINESCO 1,542,668

METHOD AND MEANS FOR TRANSMITTING POWER

Filed June 26, 1922   10 Sheets-Sheet 6

INVENTOR.
G. Constantinesco

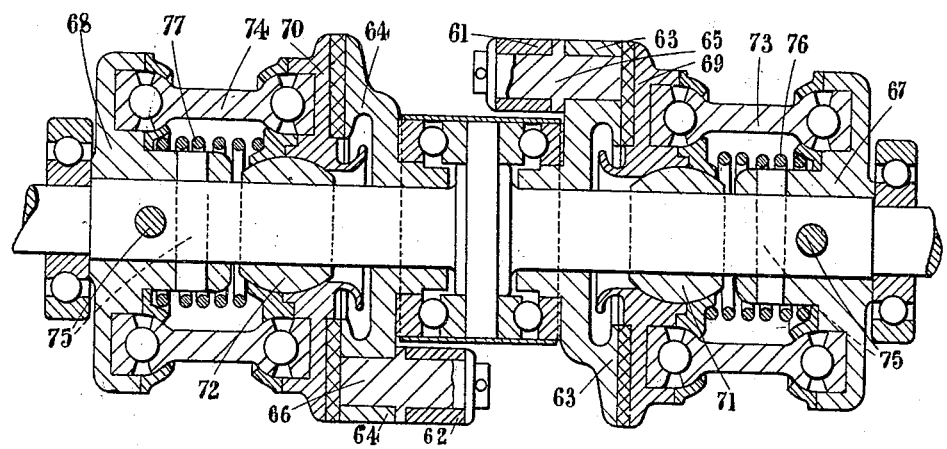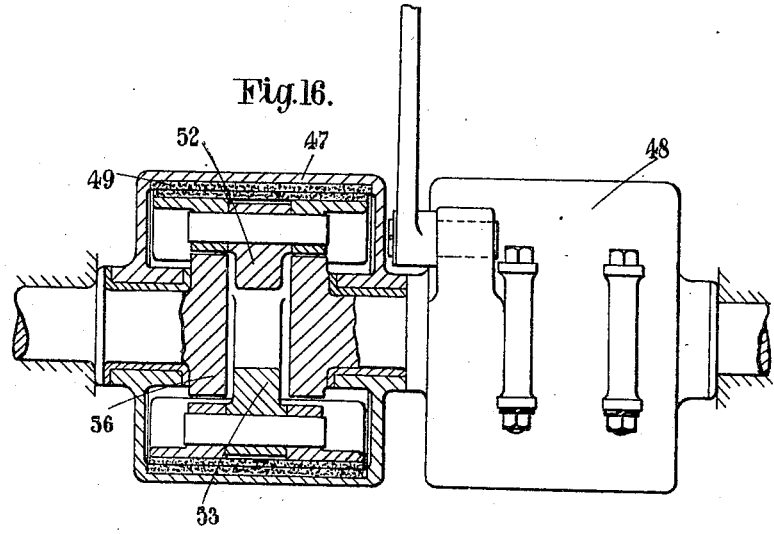

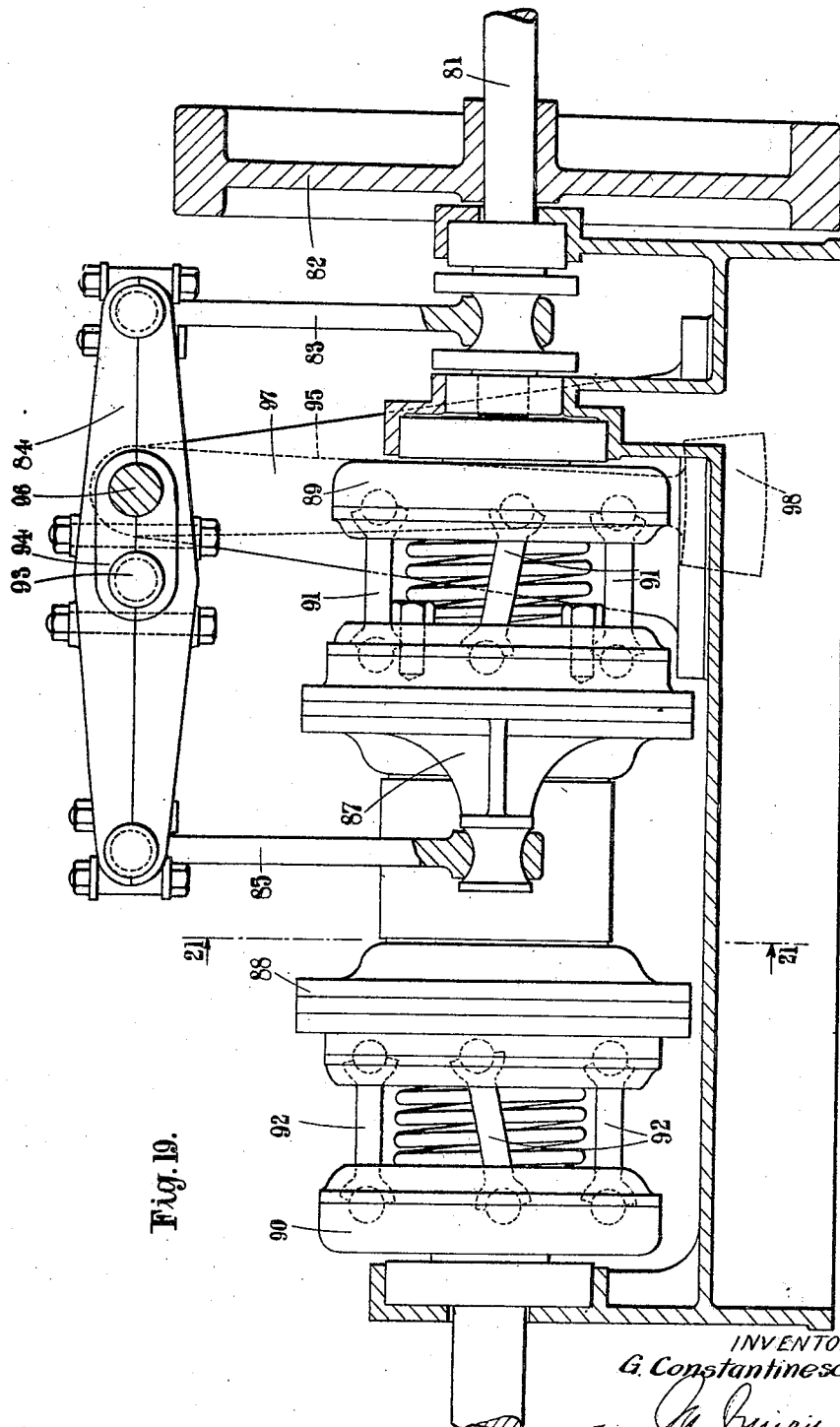

June 16, 1925.  1,542,668
G. CONSTANTINESCO
METHOD AND MEANS FOR TRANSMITTING POWER
Filed June 26, 1922   10 Sheets-Sheet 9
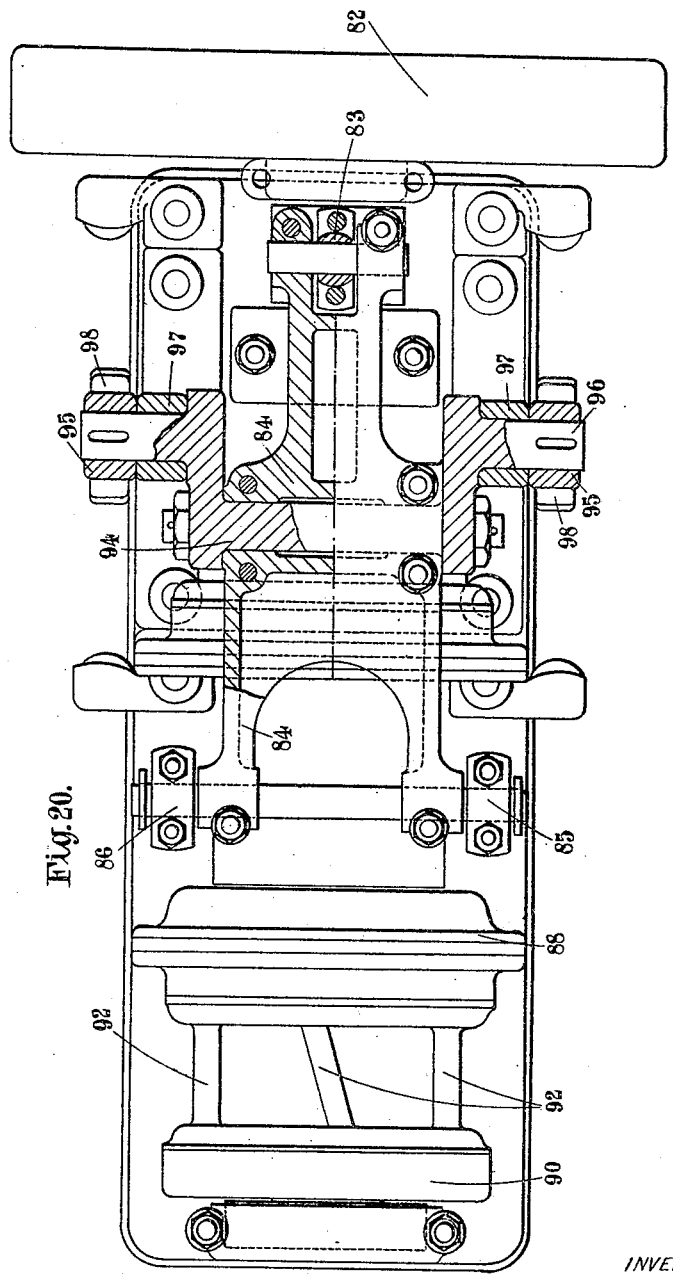
INVENTOR
G. Constantinesco
by
Att'y June 16, 1925. 1,542,668

G. CONSTANTINESCO

METHOD AND MEANS FOR TRANSMITTING POWER

Filed June 26, 1922 10 Sheets-Sheet 10

INVENTOR
G. Constantinesco
by
Att'y

Patented June 16, 1925.

1,542,668

UNITED STATES PATENT OFFICE.

GEORGE CONSTANTINESCO, OF WAYBRIDGE, ENGLAND.

METHOD AND MEANS FOR TRANSMITTING POWER.

Application filed June 26, 1922. Serial No. 570,986.

*To all whom it may concern:*

Be it known that I, GEORGE CONSTANTINESCO, a British subject, residing at "Carmen Sylva", Beechwood Avenue, Oatlands Park, Waybridge, in the county of Surrey, England, have invented Methods and Means for Transmitting Power, of which the following is a specification.

The present invention relates to an improved method and apparatus for transmitting power from internal combustion engines or other prime movers adapted to develop limited torque to driven shafts and is particularly applicable to locomotives or other vehicles, or to machinery driven by internal combustion engines, steam turbines, electromotors and the like.

The invention is of general application where the prime mover is an internal combustion engine or other engine adapted to develop limited torque and the torque to be overcome at the driven shaft is variable between wide limits.

The object of the invention is to transmit power from the engine to the driven shaft in such a manner that increased resisting torque at the driven shaft may result in an increase of engine speed, so that the power developed by the engine does not unduly decrease with increased resistance.

The invention consists broadly in a method and means for transmitting power from such a prime mover, for example, an internal combustion engine, utilizing the inertia of suitably arranged masses in such a manner that the engine speed is not unduly decreased with increase of the resisting torque.

The invention further consists in a method and means, of utilizing the inertia of a suitably arranged oscillating or reciprocating mass for transmitting power from a prime mover to a driven shaft in such a manner that the power developed by the engine does not unduly decrease with increased resisting torque.

The invention further consists in a transmission mechanism for the purpose described comprising an oscillating or reciprocating member or floating link connected at two different points to a driving shaft and a unidirectional driving mechanism, the floating link carrying or being connected to a mass capable of oscillation or reciprocation.

The invention also consists in a power unit comprising in combination a prime mover adapted to develop a limited torque whose shaft is connected to one point of a floating link, which at another point carries or is connected to a heavy mass, such floating link being connected to a device converting the oscillating motion to rotary motion.

The invention also consists in a variable resistance power unit comprising an internal combustion engine whose driving shaft transmits motion through a connecting rod to an oscillating link, the link being pivoted to a mass capable of oscillation, and also connected by two connecting rods with two opposed oscillating ratchet devices driving a rotor, such rotor being connected to the driven shaft.

The invention further consists in the improved method and means for transmitting power from prime movers hereinafter described.

In a simple illustration of the principle of the invention there may be provided a floating link one end of which is caused to move by an eccentric mounted on a rotating driving shaft and which carries at its other end a mass. An intermediate point of the lever is connected to two connecting rods actuating a driven shaft through two ratchet devices by which the oscillating movement of the floating link is converted to a rotary movement, the ratchet devices operating at each half revolution of the driving shaft.

With such an arrangement it will be seen that if the resistance to rotation of the driven shaft is small, the mass on the lever will not move far on each side of its mean position at each oscillation, and the length of travel of the ratchets will be a maximum when the resistance to rotation of the driven shaft is zero.

As the resistance to rotation of the driven shaft increases, the travel of the mass increases, and that of the ratchets decreases; consequently at each revolution of the driving shaft, owing to the smaller angular movement of the ratchets when the resistance is high, it can be shown that the torque required from the prime mover does not unduly increase. Consequently with such an arrangement, if the prime mover is an internal combustion engine, for example, a constant or increased speed of revolution of the engine can be maintained, although the torque on the driven shaft is increased. In fact it can be shown mathematically that taking into account the inertia opposed by the oscillating mass the torque on the driven shaft is proportional to the square of the speed of the prime mover.

Many modifications of the arrangement are evidently possible; but in order to effect the object of the invention, it is essential that the driving shaft and unidirectional driving connection should be connected to an oscillating or reciprocating member such as a floating link, at two different points, the link carrying or being connected to a mass capable of oscillation or reciprocation about a mean position.

In order to obtain stability without special means for maintaining a mean position of the various parts of the gear the forces acting on the oscillating mass should act in a direction away from and not towards its pivot or point of suspension.

Referring to the accompanying dagrammatic drawings:—

Figures 1 to 5 are diagrams showing various possible arrangements for carrying out the invention;

Figure 16 is a side elevation partly in section on the line 16—16, Figure 15;

Figure 18 is an elevation of another example of the invention;

Figure 19 is an axial section through the unidirectional drive of the same;

Figure 20 is a plan of the same partly in section;

Figure 4:
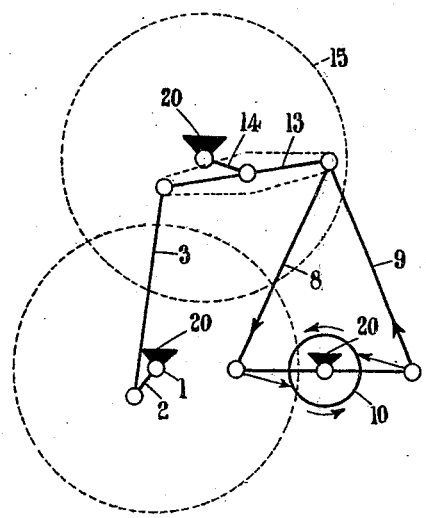

In the diagram Figure 1 the crank 2 of the driving shaft 1 is directly connected to a floating link 11 carrying a mass 12; and an intermediate point of the link is connected by connecting rods 8, 9 to the two unidirectional driving members actuating the rotor 10.

It will be seen that in this case there will be a vertical oscillating movement of the mass as well as a horizontal movement, but this is immaterial if the amplitude of the oscillation of the mass 12 is considerable relative to the length of the crank 2. If desired to balance the inertia forces, two or more systems as described may be mounted on the same driving and driven shafts, the phase angles between the cranks being suitably selected.

The form shown in Figure 2 is similar but in this case the driving crank 2 is connected to an intermediate point and the connecting rods 8, 9 to the upper end of the floating link 11.

In the diagram Figure 3, the driving shaft 1 is connected by a crank 2 and connecting rod 3 to the centre of a floating link 4 whose lower end is connected to a rod 5 carrying a mass 6 and pivoted and suspended at 7. The other end of the floating link 4 is connected by two connecting rods 8, 9 to two unidirectional driving devices operating alternately to drive the rotor 10 in one direction.

In the form shown in Figure 4 the driving crank 2 is connected to one end of a floating link 13 which near its centre is connected to a crank 14 on an oscillating flywheel 15 acting as a mass, the other end of the floating link being connected through the connecting rods 8, 9 to the two unidirectional driving devices acting on the rotor.

Figure 5:
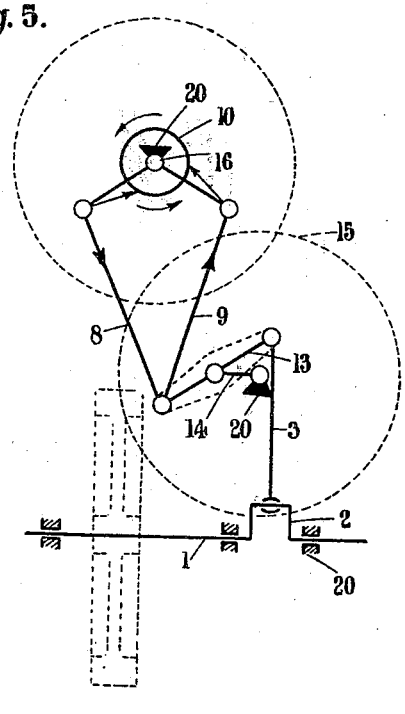

In the form shown at Figure 5, the driving shaft 1 is at right angles to the driven shaft 16, the crank 2 being connected by the rod 3 to one end of the floating link 13, which towards its centre is connected to a crank 14 on an oscillating flywheel 15, the other end of the floating link 13 being connected by the rods 8, 9 to the two unidirectional driving devices.

Figure 6:
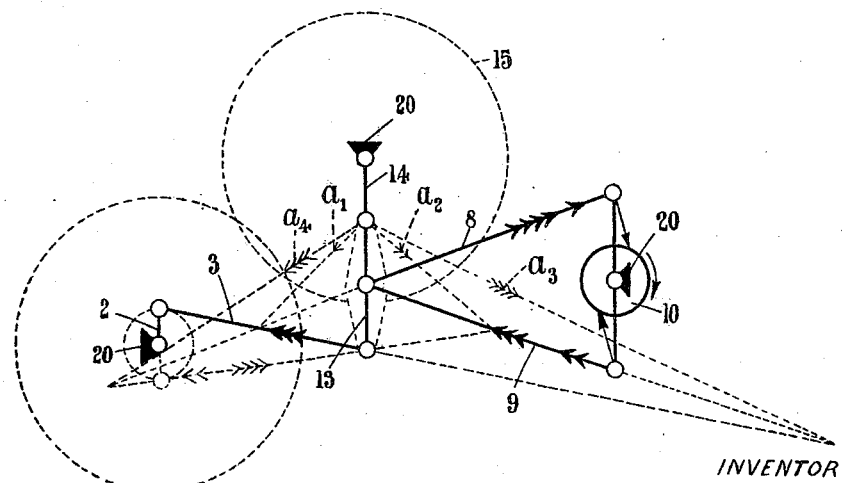
Figure 6 is a diagram showing the forces acting in one form of the mechanism.

In the diagram Figure 6 the driving crank 2 is connected by the rod 3 to the lower end of the floating link 13 whose upper end is connected to a crank 14 moving with an oscillating flywheel 15. The link 13 is connected towards its centre by the connecting rods 8, 9 to the unidirectional driving devices driving the rotor 10.

In all the diagrams the fixed pivots are indicated at 20.

It will be seen that in all the diagrammatic arrangements above described, neglecting the inertia of the oscillating mass, the motion of the driving parts is indeterminate; it is accordingly necessary to consider the stability of the system when in motion, as with incorrect positions of the fixed axis and moving pivots the amplitude of the oscillations of the flywheel or pivoted mass may tend to increase indefinitely the whole system becoming unstable, with the result that jamming and consequent breakage of the linkage will occur.

To illustrate this, the forces acting in the various parts of the apparatus in one example of the invention, are shown in the diagram Figure 6. Considering the equilibrium of the oscillating flywheel 15 it can be shown that the average resultant of the compression forces which are transmitted through the connecting rod 8 will always be between the dotted lines indicated by the arrows $a^1$, $a^4$, and the average resultant of the tension forces which are transmitted through the connecting rod 9 will be between the dotted lines indicated by the arrows $a^2$, $a^3$. I should be noted that the reverse stresses in the connecting rods 8, 9 are due to inertia of reciprocating parts in the unidirectional drive and are very small in comparison with the driving forces referred to. Consequently in the arrangement shown in this figure the resultant forces acting on the oscillating flywheel 15 will be alternately to left and right and always in the direction away from the axis about which the flywheel oscillates, so that stability of the moving system is maintained.

Figure 7:
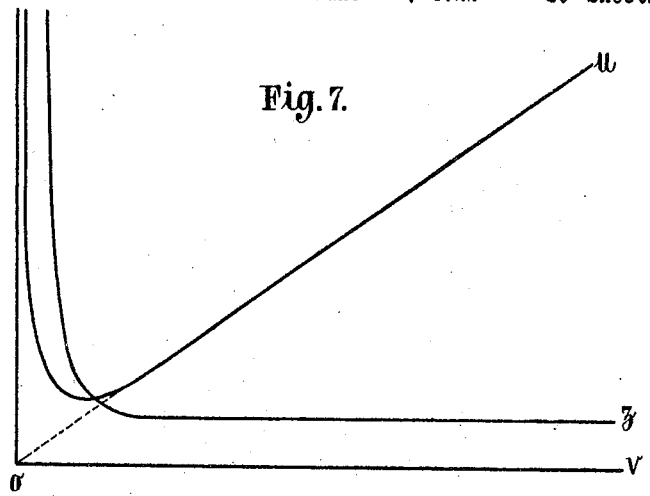
Figure 7 is a diagram showing the relative values of the speed of the prime mover, torque on the driven shaft and speed of the driven shaft, when the torque of the prime mover is kept constant.
Figure 8:
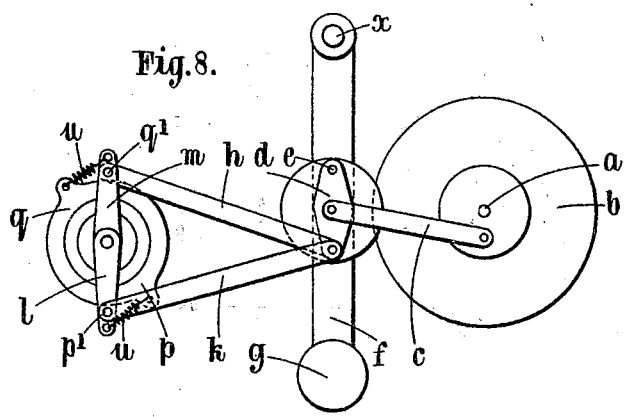
Figure 8 is a diagrammatic elevation showing one form of mechanism according to the invention.
Figure 9:
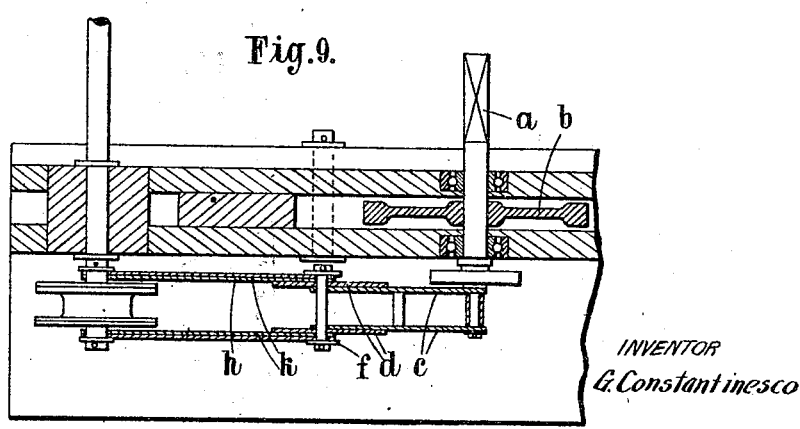
Figure 9 is a sectional plan of the mechanism.
Figure 10:
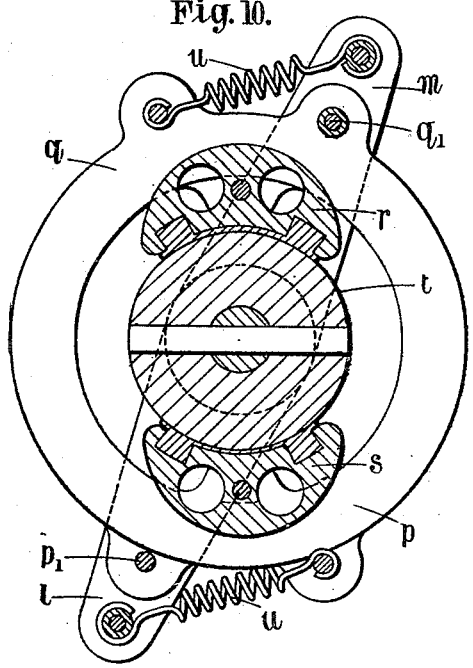
Figure 10 is a transverse section through the driven rotor.
Figure 11:
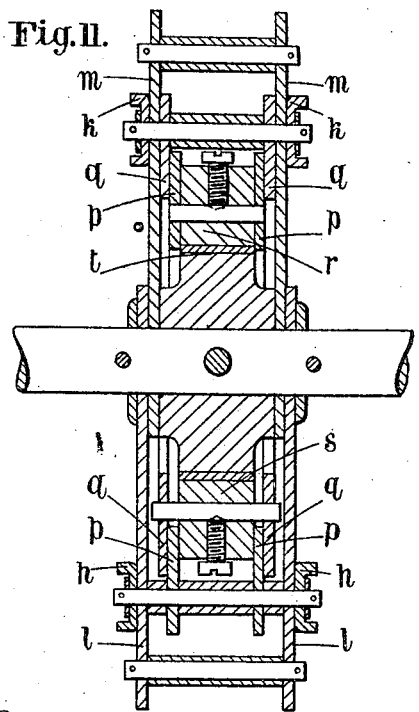
Figure 11 is an axial section through the same.

In the diagram Figure 7, if we consider the speed $v$ of driven shaft as abscissæ, the torque at driven shaft will be approximately represented by the ordinates of the curve $z$ and the speed of the prime mover by the ordinates of the curve $u$, the torque of the driving shaft being kept constant.

From these curves it can be seen that as the speed of driven shaft gets beyond a certain speed, the torque at the driven shaft tends towards a constant value, and the speed of the prime mover varies in linear proportion with that of the driven shaft very much as in ordinary gear of constant ratio. On the other hand when the speed of the driven shaft diminishes below a certain value, the torque at the driven shaft increases very rapidly and similarly the speed of the prime mover also increases.

In carrying the invention into effect as illustrated in Figures 8, 9, 10 and 11, the prime mover drives the shaft $a$ which carries a flywheel $b$ and is connected by the connecting rod $c$ to the centre of a floating link $d$. The upper end of this link is pivoted at $e$ to a swinging lever $f$ pivoted at $x$ which carries at its lower end a mass $g$. The lower end of the floating link is connected by two pairs of connecting rods $h$ $k$ to two double arms $l$ $m$ oscillating about the axis of the rotor. On the oscillating arms at $p_1$, $q_1$ respectively are pivoted double circular frames $p$ $q$ carrying pivoted friction pads $r$ $s$, Figure 10, bearing on the rotor on the side of its circumference remote from the pivots of the frames. The pads $r$ $s$ are adapted to bear on the circumference $t$ of the rotor and grip the rotor in turn so as to drive it always in the direction in which the pads tend to approach the rotor owing to the fact that the pivot of each pad on its frame and the pivot of each frame on its driving arm are situated on a line which does not pass through the centre of the rotor. Further the angle between the diameters on which these pivots are situated is less than the angle of friction at starting with the particular materials used to form the surfaces of the pad and rotor. The lower connecting rods $k$ are under tension and the upper rods $h$ under compression. The pads are of substantial length occupying nearly a quarter of the circumference of the rotor. The springs $u$ serve merely to keep the friction pads in light contact with the rotor on the idle stroke. Accurately placed pins might, however, be employed with or without springs for the same purpose, especially where a yielding material, such as Ferodo, leather or rubber is used in the pads.

It is desirable in some cases to provide an elastic drive between the rotor and the shaft to be driven as in the two phase form illustrated the torque is intermittent. If considerable inertia on the driven shaft has to be overcome an elastic drive of some type is of importance.

It will be seen that with the apparatus above described, rotation of the driving shaft causes oscillation of the floating link $d$ and this oscillation can be transmitted either to the mass $g$ through the lever $f$ or through the connecting rods $h$ $k$ to the unidirectional device on the rotor. As the speed of the driving shaft is increased without much load on the driven shaft, the amplitude of oscillation of the mass $g$ decreases and the stroke of the oscillating members driven by the rods $h$ and $k$ increases, thus increasing the speed of the rotor relative to the speed of the prime mover. If the apparatus is started with a heavy resisting torque acting on the driven shaft the swinging mass immediately starts oscillating at its maximum amplitude producing high alternating forces in the connecting rods $h$ $k$ the forces being proportional to the square of the speed of the prime mover; so that if the speed of the prime mover is sufficiently increased, the torque on the driven shaft is overcome by the unidirectional mechanism and the driven shaft commences to rotate. Until rotation has started no energy is taken up except the amount absorbed by internal frictions. The driven shaft then rotates with corresponding diminution of the movement of the swinging lever, the torque to overcome the resistance at the driven shaft being proportional to the square of the speed of the prime mover and directly produced by the forces set up in the connecting rods $h$ $k$ and proportional to the square of the speed of the prime mover. The relative values of speeds and torque produced by the mechanism are shown approximately in the diagram, Figure 7, in which it will be seen that many forms of the invention other than that above described are possible and many other forms of mechanism may be adopted in place of the unidirectional drive mechanism illustrated; for example, three mechanisms as described differing in phase from each other by 120 degrees may be provided acting on the same shaft and in this case almost continuous rotation instead of intermittent rotation would be obtained. The unidirectional drive mechanism employed may be of any suitable type. Further, instead of a swinging lever an oscillating flywheel or mass of any shape may be employed.

It will be seen that with a mechanism constructed as above described, vertical movement of either of the centres, that is either of the axis of the rotor, axis of the mass, or axis of the prime mover, will produce very little effect on the motion. Further, slight horizontal movement of these centres also is permissible. Alternating movement of the rotor centre in the horizontal direction will merely serve to slightly increase the speed of the rotor. It is possible, therefore, with such mechanism to allow small variations of the distances between any two of the supporting centres of driving shaft, mass, and driven shaft. This is of extreme convenience in motor vehicles, as parts of the apparatus may be mounted on springs and parts directly on the road wheels if desired.

Figure 12:
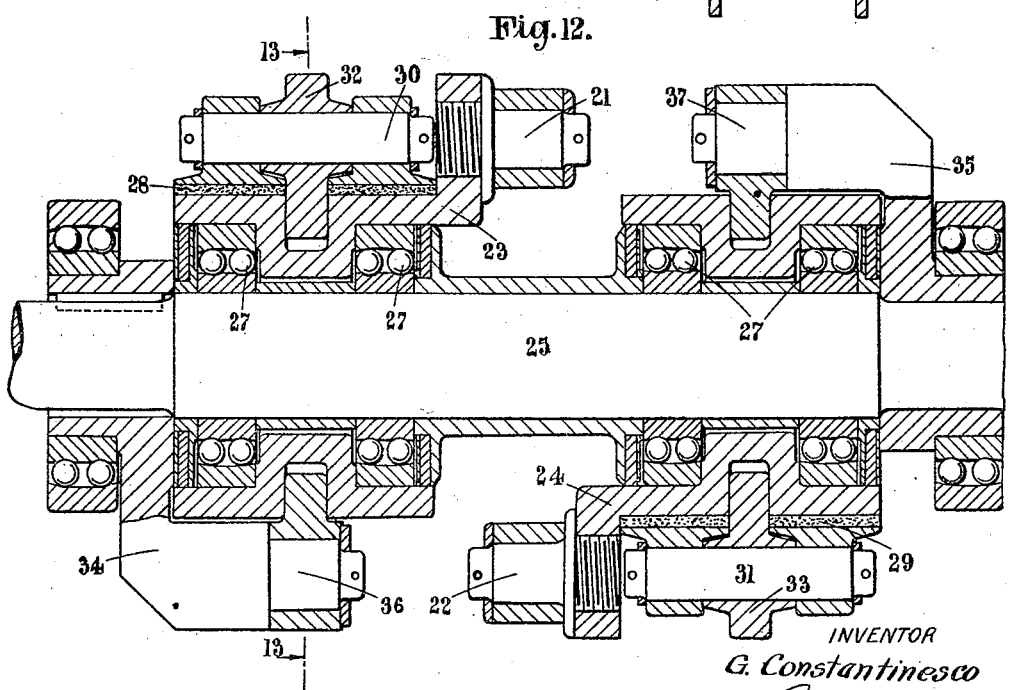
Figure 12 is a section through another form of unidirectional driving device which may be employed.
Figure 14:
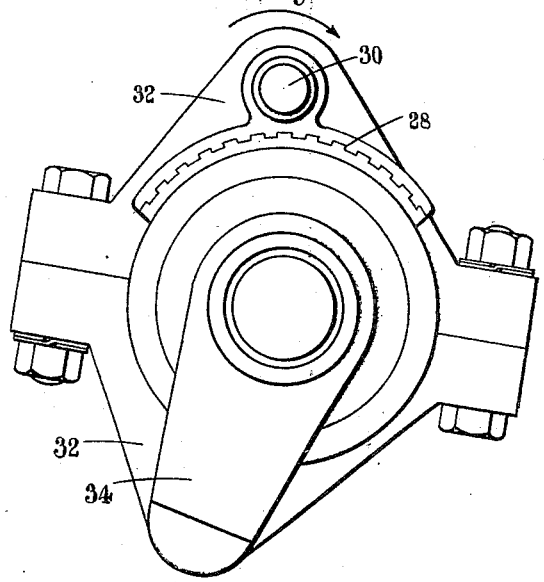
Figure 14 is an end elevation with the ball race removed.
Figure 13:
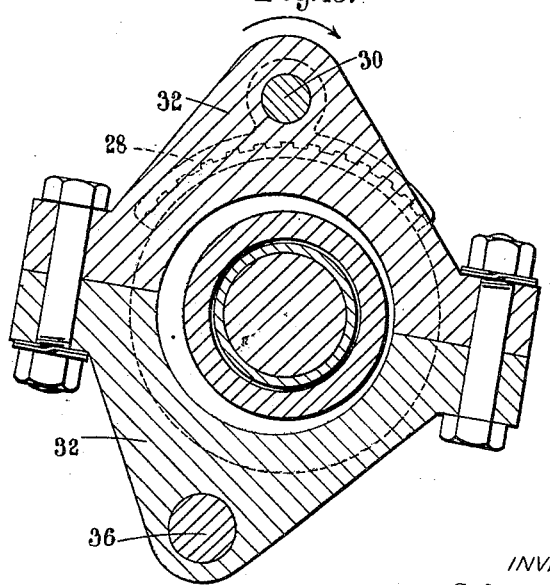
Figure 13 is a section on the line 13—13, Figure 12.

In the form of unidirectional driving device shown at Figures 12, 13 and 14, the connecting rods from the prime mover are connected to the pins 21, 22 which are carried by sleeve members 23, 24 capable of oscillating about the shaft 25 on ball bearings 27. The friction pads 28, 29 are pivoted at 30, 31 on link members of plate form 32, 33, which are themselves pivoted to the rotor members 34, 35 at 36 and 37, these rotor members being keyed to the rotor shaft 25.

In this form of the unidirectional drive the upper friction pad pivoted on the rotor is gripped and driven when the oscillating member 23 moves in the direction of the arrow, the lower pad on the other part of the rotor being gripped and rotated in the same direction during the return oscillation by the oscillating member 24.

Figure 15:
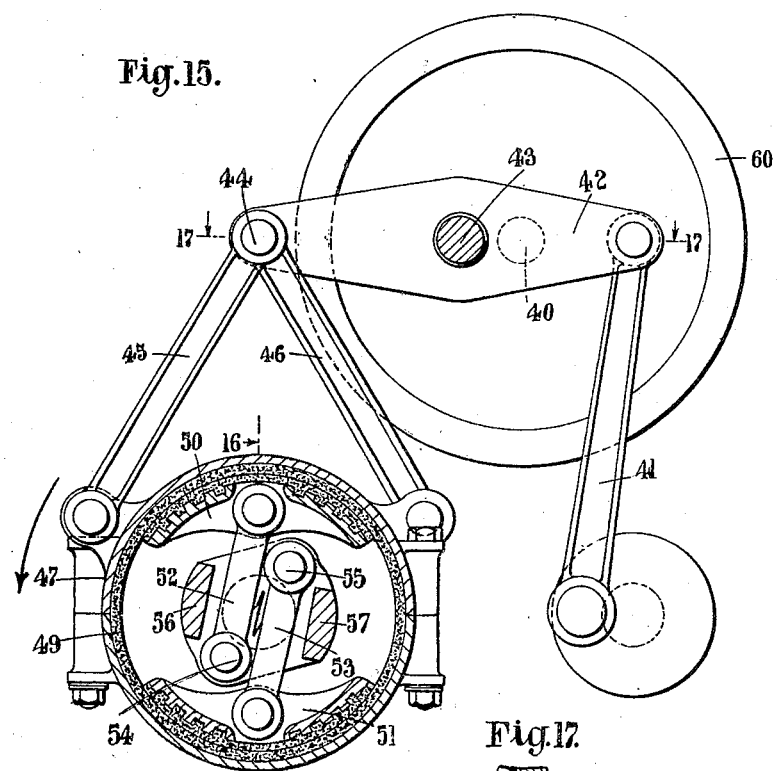
Figure 15 is a section through another form of the apparatus.
Figure 17:
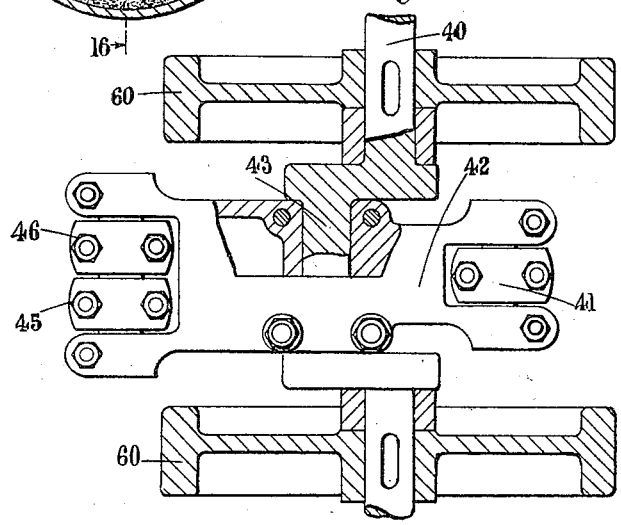
Figure 17 is a section on the line 17—17, Figure 15.

In the form of the invention shown in Figures 15, 16 and 17 the prime mover is connected by a connecting rod 41 to one end of the floating link 42 (which for assembly should be made in two parts) pivoted at 43 to the oscillating flywheel 60 which oscillates about the axis 40. The link is connected at its other end 44 to two connecting rods 45, 46 which oscillate respectively the two drum members 47, 48. The drum members are lined with friction surfaces as shown at 49 which may be of leather, each drum drives one of the two portions 56, 57 of the rotor situated within it; and each rotor carries a pair of friction pads 50, 51 pivoted at the ends of links 52, 53, these links being pivoted on the rotor at 54, 55 and passing through a suitable central space allowed in the rotor.

In this form the direction of movement in which the oscillating member 47 grips the rotor is shown by the arrow in Figure 15.

In another form of the unidirectional driving device, Figure 18, suitable for use in the transmission, the driving of the rotor is effected through face clutches. The connecting rods 61, 62 from the floating link are pivoted to the oscillating members, 63, 64 by pins 65, 66 and drive the rotor 67, 68 through friction plates 69, 70, which are mounted on the spherical members 71, 72. The locking of the device for driving the rotor in one direction is effected by pressure exerted through the slightly inclined rods 73, 74 which press through ball ends against the clutch members 69, 70 and the parts 67, 68 of the rotor which are keyed to the driven shaft by stout pins 75. Springs 76, 77 are provided adapted to keep the members 69, 70 in light contact with the oscillating members, 63, 64 during the idle stroke. The actual friction surface may be provided by annular leather, Ferodo, rubber, or like pads giving a considerable gripping surface.

Figure 21:
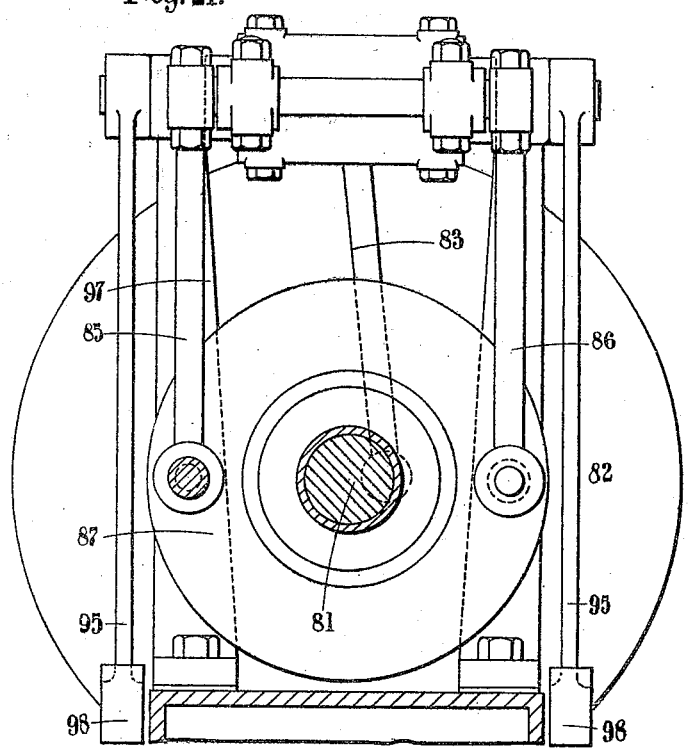
Figure 21 is a front elevation partly in section on the line 21—21 of Figure 19.

In the form of the invention shown in Figures 19, 20 and 21, the shaft 81 of the prime mover carries a flywheel 82 and is connected by the connecting rod 83 with the floating link 84. This link 84 is connected at its other end to the almost vertically moving connecting rods 85, 86 which actuate the oscillating members 87, 88 which are adapted to drive the rotor discs 89, 90 through inclined rods 91, 92, as described above with reference to Figure 18. The lever 84 is pivoted at 93 to a crank 94 keyed rigidly to the vertical levers 95 pivoted at 96 in the fixed standards 97 and carrying at their lower ends masses 98. A certain freedom is permitted for angular movement at the various pivots at the ends of the connecting rods by making the bearings of curved form as illustrated in order to allow angular play.

It will be seen that in this modification the system is in indifferent dynamic equilibrium so that quite a small force is able to keep the oscillating mass in the mean position. As illustrated gravity effects this, and suitable buffers may be provided to prevent excessive shifting of the mean position of the oscillating mass to one side or the other.

The same object may be effected by arranging springs tending to hold the end of the floating link connected to the oscillating members in a predetermined mean position.

Also with this form of the invention since all the connecting rods are substantially parallel a unidirectional driving device capable of driving in either direction could be employed.

The invention described above is suitable for traction purposes. The transmission gear, however, will be seen to be applicable to a large number of other purposes in which it is desired to overcome a torque at the driven shaft variable between very wide limits either with a constant torque prime mover, or a prime mover having other characteristics, for example, using the transmission gear for driving rolling mills by steam turbines, internal combustion engines or electric motors. Also, it can be applied to machine tools such as drilling machines, and as a mechanism for gearing down from high speed shafts for various purposes. Many other examples of transmission for which the gear is suitable will naturally present themselves.

Although in apparatus constructed as above described the movement of the oscillating members is approximately harmonic and the movement of the driven shaft is unidirectional, the shock which would be expected to take place at the instant of gripping will in many cases be sufficiently taken up by the natural give of the system.

I claim—

1. An automatic variable speed gear for transmitting power to a driven shaft which has to be rotated against a variable resisting torque comprising in combination a steadily rotating driving shaft, means for deriving alternating motion from said shaft, means for splitting such motion into two components, a freely supported mass, means for transmitting one of said component motions to said mass without absorbing energy and unidirectional driving mechanism giving at least two impulses in the same direction on said driven shaft for each revolution of said steadily rotating shaft.

2. An automatic variable speed gear for transmitting power to a driven shaft which has to be rotated against a variable resisting torque comprising in combination a driving crank, a freely supported mass capable of oscillation, a pair of unidirectional driving devices adapted to drive a driven shaft alternately in the same direction and means for splitting the motion of said driving crank between said oscillating mass and said unidirectional driving devices.

3. An automatic variable speed gear for transmitting power from a prime mover to a shaft which has to be rotated against a variable resisting torque comprising in combination a driving crank, a mass capable of oscillation, a rotor, a pair of unidirectional driving devices adapted to drive such rotor alternately in the same direction, a floating lever, a connection from said driving crank to said floating lever, a pivot connecting said floating lever to said oscillating mass and a pivot on said floating lever connected to said unidirectional driving devices.

4. An automatic variable speed gear for transmitting power from a steadily rotating driving shaft to a shaft which is to be rotated against a variable resisting torque comprising in combination a crank, on said driving shaft, an oscillating member, a pair of unidirectional driving devices acting on said driven shaft, an oscillating member, a freely supported mass, and means connecting said unidirectional driving devices to said oscillating member and to said freely supported mass, the impulses given by the driving crank being divided between said mass and said unidirectional driving devices.

5. An automatic variable speed gear for transmitting power from a steadily rotating driving shaft to a shaft which is to be rotated against a variable resisting torque comprising in combination a driving shaft, a floating link, a connection from said driving shaft to said floating link, a member pivoted at a fixed point and carrying a mass, said member being pivoted to said floating link, a pair of connecting rods driving oscillating members, said rods being pivoted to said floating link, and unidirectional driving devices moving with said oscillating members adapted to give two impulses to the driven shaft at each revolution of the driving shaft.

In testimony whereof I affix my signature.

GEORGE CONSTANTINESCO.